United States Patent
Zielinski et al.

(10) Patent No.: US 7,610,929 B2
(45) Date of Patent: Nov. 3, 2009

(54) AIR BAG INFLATION/ DEFLATION SYSTEM

(75) Inventors: James S. Zielinski, Schaumburg, IL (US); Thomas C. Keenan, Franklin, TN (US); Joseph E. Tyer, Lake Forest, IL (US); Terrence P. Meier, Naperville, IL (US)

(73) Assignee: Illinois Tool Works Inc., Glenview, IL (US)

( * ) Notice: Subject to any disclaimer, the term of this patent is extended or adjusted under 35 U.S.C. 154(b) by 232 days.

(21) Appl. No.: 10/147,894

(22) Filed: May 20, 2002

(65) Prior Publication Data

US 2003/0213518 A1 Nov. 20, 2003

(51) Int. Cl.
*F16K 15/20* (2006.01)
*B61D 45/00* (2006.01)

(52) U.S. Cl. .................. 137/223; 137/232; 141/114; 141/317; 410/119

(58) Field of Classification Search ............... 137/223, 137/232, 522, 855; 220/375, 780, 789, 790, 220/791, 793; 141/1, 114, 313, 317; 410/119, 410/125; 446/224
See application file for complete search history.

(56) References Cited

U.S. PATENT DOCUMENTS

| | | | | |
|---|---|---|---|---|
| 679,519 | A * | 7/1901 | Smith | 137/232 |
| 1,315,955 | A * | 9/1919 | Gill | 446/224 |
| 2,677,388 | A * | 5/1954 | Neff | 137/232 |
| 2,688,995 | A * | 9/1954 | Wagoner | 220/789 |
| 3,458,079 | A * | 7/1969 | Gasbarra | 220/787 |
| 3,692,208 | A * | 9/1972 | Croyle et al. | 220/789 |
| 4,004,614 | A * | 1/1977 | Mackal et al. | 137/232 |
| 4,114,230 | A * | 9/1978 | MacFarland | 137/223 |
| 4,640,435 | A * | 2/1987 | Dutt | 220/790 |
| 4,823,831 | A * | 4/1989 | Jaw | 137/223 |
| 4,823,841 | A * | 4/1989 | Graber | 137/625.41 |
| 5,082,244 | A | 1/1992 | Krier et al. | |

(Continued)

FOREIGN PATENT DOCUMENTS

EP 0 987 194 3/2000

(Continued)

*Primary Examiner*—John Rivell
(74) *Attorney, Agent, or Firm*—Law Offices of Steven W. Weinrieb (57) ABSTRACT

A cargo or dunnage air bag inflation and deflation system comprises an inflation-deflation valve member, a cap-type plug member, and an air gun implement having a fill nozzle and an exhaust nozzle mounted upon opposite ends thereof for respective connection to the valve member in order to perform inflation and deflation operations. The valve member comprises a flapper or check valve element pivotally mounted upon the valve member so as to permit inflation or deflation of the cargo or dunnage air bag when the flapper or check valve element is moved away from its valve seat, and to substantially maintain the cargo or dunnage air bag in its inflated state when the flappper or check valve element is effectively seated upon its valve seat. The cap-type plug member is removably mounted upon the inflation-deflation valve member so as to effectively close and seal the valve assembly when the cap-type plug member is mounted upon the valve member, and effectively uncovers the valve member when the cap-type plug member is dismounted from the valve member so as to permit the air gun implement to be operatively connected to the air valve member in order to perform an inflation or deflation operation.

24 Claims, 6 Drawing Sheets

U.S. PATENT DOCUMENTS

| | | | |
|---|---|---|---|
| 5,119,842 A | 6/1992 | Jaw | |
| 5,209,737 A * | 5/1993 | Ritchart et al. | 604/256 |
| 5,343,889 A | 9/1994 | Jaw | |
| 5,566,728 A | 10/1996 | Lange | |
| 5,626,257 A * | 5/1997 | Carlson | 220/578 |
| 5,651,403 A | 7/1997 | Andersen | |
| 5,660,512 A | 8/1997 | Elze et al. | |
| 5,806,572 A * | 9/1998 | Voller | 141/10 |
| 5,862,843 A * | 1/1999 | Corbitt, III | 137/223 |
| 6,138,711 A | 10/2000 | Lung-Po | |

FOREIGN PATENT DOCUMENTS

| | | |
|---|---|---|
| NZ | 201884 | 1/1986 |

* cited by examiner

FIG. 9 though means through a hole provided within the sheet 24 so

AIR BAG INFLATION/DEFLATION SYSTEM

FIELD OF THE INVENTION

The present invention relates generally to inflatable dunnage air bags, sacks, containers, and the like, and more particularly to a new and improved air bag inflation and deflation system for inflating and deflating the inflatable bladder disposed interiorly of a dunnage air bag, sack, container, or the like, in connection with the use of the dunnage air bag, sack, container, or the like, for securing or bracing cargo within the holds of, for example, railroad cars, airplanes, ships, truck trailers, and similar cargo containers or holds. Still more particularly, the present invention relates to a new and improved air bag inflation and deflation system comprising a valve assembly which is adapted to be physically incorporated within and structurally mounted upon a wall portion of the air bag, sack, container, and the like, and a gun which is uniquely adapted to be operatively associated with such valve assembly so as to readily achieve the inflation and deflation of the inflatable air bag, sack, container, or the like.

BACKGROUND OF THE INVENTION

Cargo or dunnage air bags are used in the cargo shipment or transportation industry as a means for readily and easily securing or bracing cargo within the holds of, for example, railroad cars, ships, airplanes, truck trailers, and the like. Such dunnage or cargo air bags conventionally comprise an inflatable bladder which is enclosed within an outer bag or envelope fabricated from a plurality of paper plies. The air bags are conventionally of such construction and size as to readily enable the same to be inserted into voids or spaces defined between spaced loads, or between a particular cargo load and a side or end wall of the cargo container or hold, whereupon inflation of the air bag, the air bag will expand thereby fixedly engaging the adjacent cargo loads or the cargo load and container wall so as to secure the cargo loads against undesirable movement during transit. Obviously, in order to achieve the inflation of the cargo or dunnage air bags to a predetermined pressurized level, such air bags are also conventionally provided with an inflation valve assembly which permits compressed or pressurized air to be conducted into the interior portion of the inflatable bladder. Typically, the inflation valve assembly comprises a tubular valve body having a flange portion integrally fixed thereto. The flange portion is welded or heat-sealed to an interior wall portion of the inflatable bladder so as to form an air-tight seal therewith, while the tubular valve body projects outwardly from the air bag so as to be externally accessible for fluidic communication with a suitable air inflation fixture or assembly by means of which the compressed or pressurized air can be conducted into the interior portion of the inflatable bladder. The inflation valve assembly conventionally comprises a valve stem which is mounted within the tubular valve body and is movable between CLOSED and OPEN states. More particularly, the valve stem is normally spring-biased toward the CLOSED state but is able to be moved to the OPEN state against the spring-biasing force by means of the air inflation fixture or assembly.

Figure 1:
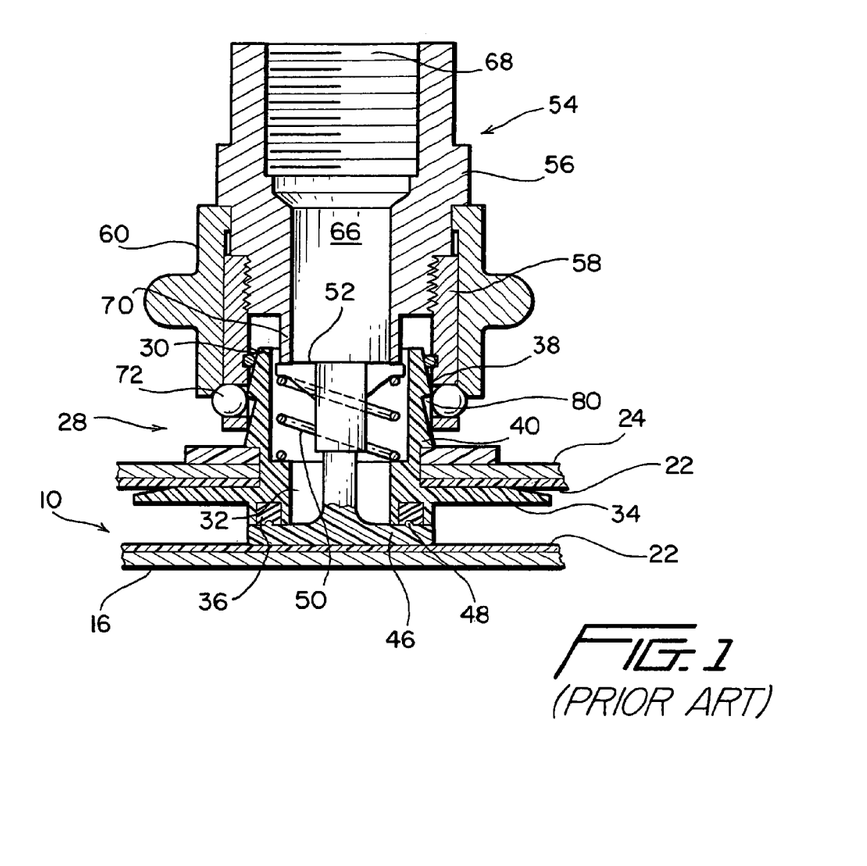
FIG. 1 is a cross-sectional view of a first PRIOR ART cargo air bag inflation valve assembly as mounted upon an inflatable cargo air bag.

An example of such a conventional or typical cargo air bag inflation valve assembly is disclosed within U.S. Pat. No. 5,082,244 which issued on Jan. 21, 1992 to Krier et al. As disclosed within FIG. 1, which corresponds in part to FIG. 5 of the noted patent to Krier et al., the air bag is disclosed at 10 and is seen to comprise first and second oppositely disclosed sheets or plies 16,24 with an inflatable bladder 22 interposed therebetween. An air bag inflation valve assembly 28 comprises a flange portion 34 which is welded to an interior portion of the plastic bladder 22, and a tubular valve body 30 which passes through a hole provided within the sheet 24 so as to effectively define a fixture external of the air bag 10 for facilitating inflation of the internal bladder 22 with compressed air. The valve body 30 has a passageway 32 defined therethrough, and a valve stem 44 is located within the passageway 32. The lower end portion of the valve stem 44 comprises a valve closure plate 46 which has an annular portion 48 which is adapted to be seated upon a valve seat member 36 of the valve body 30. A spring 50 normally biases the valve stem 44 to its CLOSED position, and the valve stem 44 is movable to its OPENED position when a force is imposed upon the end 52 of the valve stem 44 which is disposed opposite the valve closure plate 46. An inflation mechanism 54 includes a main body portion 56 within which there is provided an internally threaded portion 68 for threaded engagement with an air hose, not shown, by means of which compressed air can be supplied for inflating the bladder 22 through means of an axially oriented passageway 66. An annular member 58 is threadedly mounted upon a lower end portion of the body portion 56 and has a plurality of detent balls 72 mounted thereon. A collar member 60 is slidably mounted upon the annular member 58, and an annular portion 70 also projects axially downwardly from the body portion 56 for engaging the upper end portion 52 of the valve stem 44. When the collar member 60 is slidably moved downwardly with respect to the annular member 58, the detent balls 72 are forced radially inwardly so as to effectively lock the inflation mechanism 54 upon the inflation valve assembly 28, by engaging annular detent surface 80 defined between inclined surface portions 38,40, so as to achieve inflation of the bladder 22.

Figure 2:
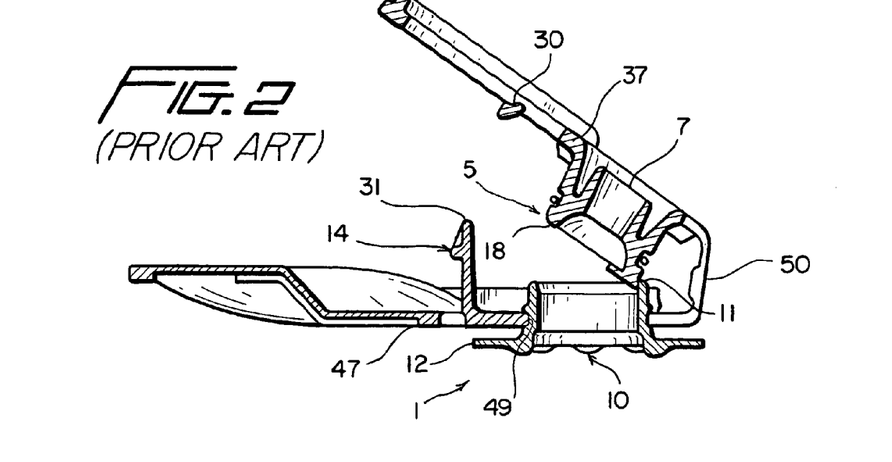
FIG. 2 is a cross-sectional view of a second PRIOR ART cargo air bag inflation valve assembly to be mounted upon an inflatable cargo air bag.

While the inflation valve assembly 28 of Krier et al. has proven to be operationally satisfactory, it can nevertheless be appreciated that the assembly 28 does comprise a substantial number of operative components and is therefore in fact relatively complex. Another conventional or PRIOR ART filling nozzle or inflation valve assembly for use in conjunction with the filling of cargo or dunnage air bags, sacks, containers, or the like, and which is relatively simple in structure and operation, is disclosed within U.S. Pat. No. 5,651,403 which issued on Jul. 29, 1997 to Andersen. As can be appreciated from FIG. 2, which substantially corresponds to FIG. 1 of the Andersen patent, it is seen that the entire closure assembly 1 of Andersen comprises a filling nozzle 5 with valve holder means 18 for holding or receiving a closable valve 7, and a flanged member 10 which includes a cylindrical or tubular portion 11 and a plate-shaped portion 12 which is adapted to be fixedly secured to the interior of the inflatable dunnage air bag or container. The filling nozzle 5 includes a lower portion 47 which is snap-connected onto the flanged member 10 as at 49, and the upper portion of the filling nozzle 5, upon which the closable valve 7 and valve holder 18 are disposed, is pivotally mounted upon the flanged member 10 by means of a hinge member 50. When the container or dunnage air bag is to be closed, the filling nozzle 5 sealingly engages the flanged member 10 and is retained at such position by means of a snapping hook 30 snap-engaging a snap-connection 14,31 provided upon the flanged member 10. When the container or dunnage air bag is to be inflated with compressed air, a bayonet lock 37 is adapted to be mated with a gripping coupling through which compressed air may be delivered to the assembly 1.

While the system of Andersen is readily appreciated to be substantially simpler in construction as compared to the system of Krier et al., it is nevertheless desirable to construct an inflation valve assembly which simplifies the overall structure of the assembly still further. In addition, it is also desirable to utilize a suitable implement in conjunction with the valve assembly which not only readily facilitates the inflation of the dunnage air bag, sack, container, or the like, but likewise facilitates the deflation of the dunnage air bag, sack, container, or the like, so as to not only efficiently secure cargo, but in addition, to efficiently enable the unloading of the cargo from the particular cargo holds of the particular truck, airplane, ship, or railroad transportation facility. These operational requirements seem to have been met by means of still another conventional or PRIOR ART air valve mechanism for an inflatable device which is disclosed within U.S. Pat. No. 6,138,711 which issued to Lung-Po on Oct. 31, 2000.

Figure 3A:
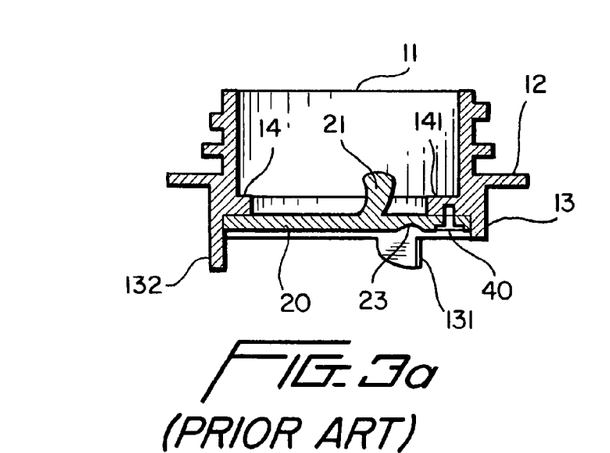
FIGS. 3a and 3b are cross-sectional views of a third PRIOR ART inflation valve assembly to be mounted upon an object to be inflated, wherein the valve assembly is respectively disclosed in its CLOSED and OPENED positions.
Figure 3B:
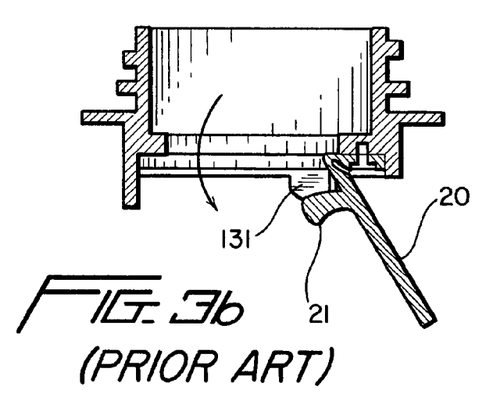
Figure 4:
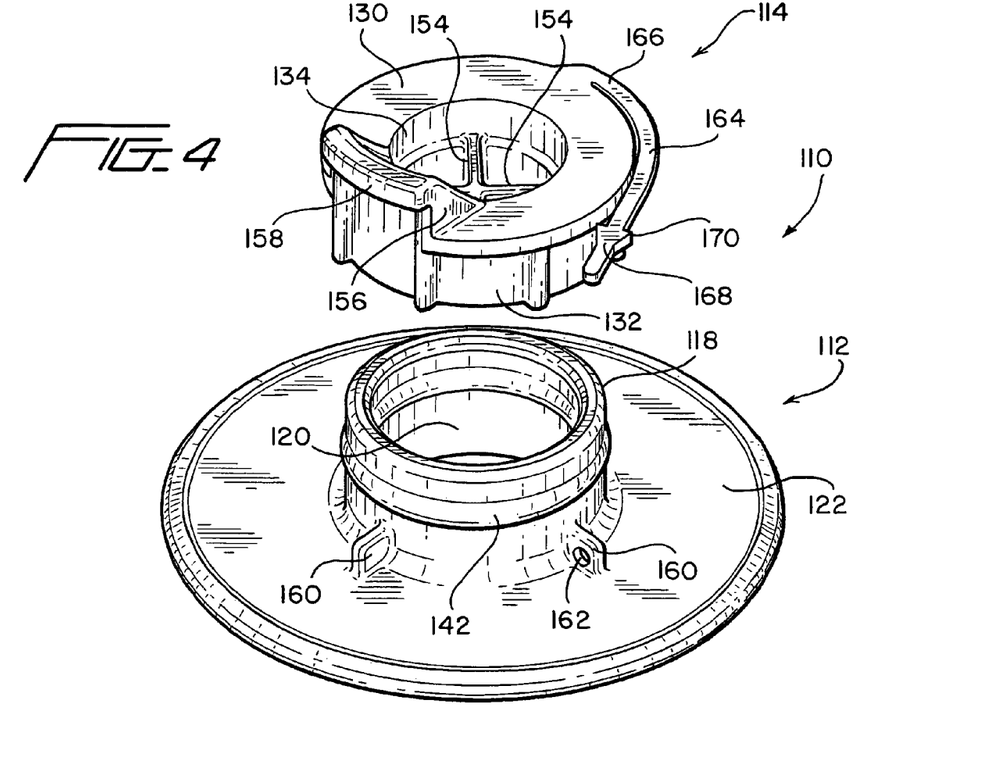
FIG. 4 is an exploded perspective view of a first embodiment of a new and improved cargo or dunnage air bag inflation-deflation valve member and cap-type plug assembly constructed in accordance with the principles and teachings of the present invention and showing the cooperative parts thereof.
Figure 5:
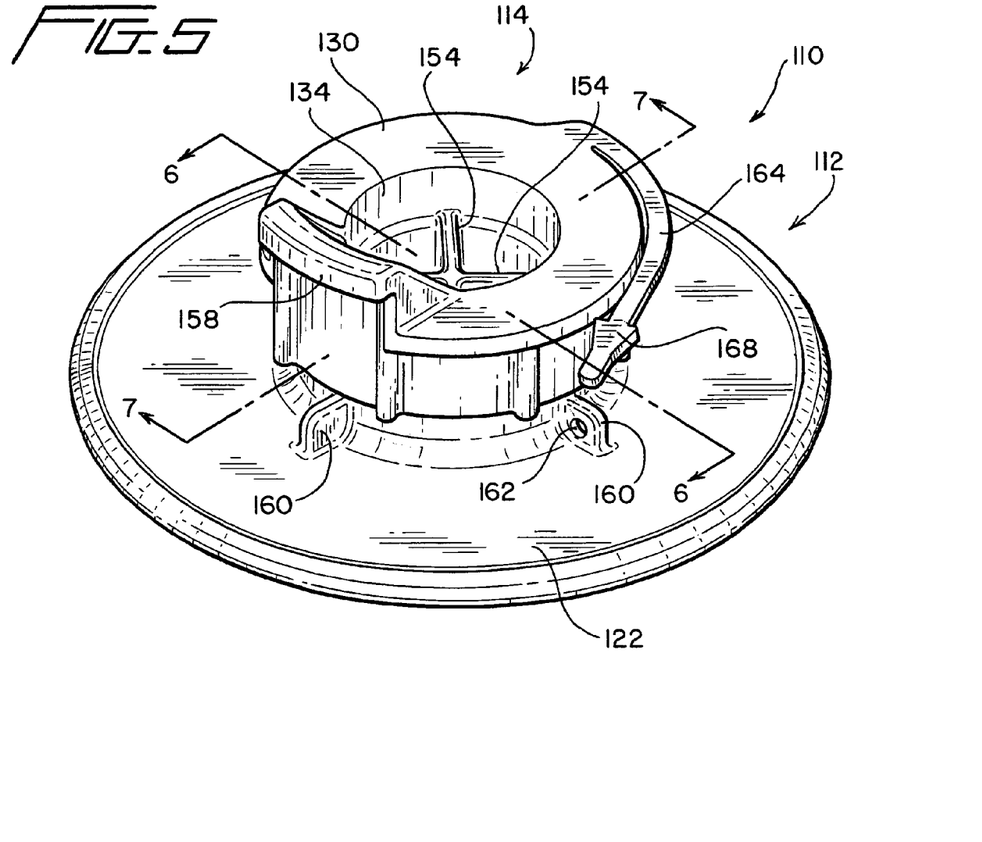
FIG. 5 is an assembled perspective view of the new and improved cargo or dunnage air bag inflation-deflation valve member and cap-type plug assembly shown in FIG. 4.

As disclosed within FIGS. 3a and 3b, which substantially correspond to FIGS. 3 and 4 of the Lung-Po patent, the air valve mechanism comprises a valve block 10 which is seen to include an upper body portion 11, a lower body portion 13, and a radially outwardly extending annular mounting flange member 12 interposed between the upper and lower body portions 11,13 for facilitating the mounting of the valve mechanism upon an external wall portion of the object to be inflated. A radially inwardly extending annular flange member 14 is also interposed between the upper and lower body portions 11,13, and a mounting or positioning portion 141 is integral with one side of the flange member 14 for mounting a valve flap 20 thereon. The valve flap 20 comprises a deformable rubber flap which is mounted within the lower body portion 13 beneath the radially inwardly extending flange member 14 and includes a folding groove 23 which effectively divides the valve flap 20 into a fixed flap portion mounted upon the mounting or positioning portion 141 by means of a fastening device 40, and a free flap portion which is movable between OPEN and CLOSED positions as seen in FIGS. 3b and 3a, respectively. A pair of locating plates 131 project downwardly from substantially diametrically opposite sides of the lower body portion 13, and it is noted that the diametrical or chordal extent or distance defined between the locating plates 131 is less than the diametrical extent of the valve flap 20. Accordingly, when the valve flap 20 is moved by compressed air from the CLOSED position to the OPENED position, it must deform in order to pass beyond the locating plates 131. In a similar manner, in order to move the valve flap 20 from the OPENED position back to its CLOSED position, the valve flap 20 is necessarily provided with a finger rod 21 so as to again cause deformation of the valve flap 20 and pull the same beyond the locating plates 131. It can therefore be appreciated that while the valve mechanism of Lung-Po appears to be operatively satisfactory, potential is present for the jamming of the valve flap 20 within the mechanism. In addition, the valve mechanism of Lung-Po obviously does not lend itself to automatic inflation and deflation operational modes or techniques in view of the need for operator assistance in moving the valve flap 20 from the OPENED position to the CLOSED position.

A need therefore exists in the art for a new and improved cargo air bag inflation and deflation system which is relatively simple in structure, and which facilitates both the automatic inflation and deflation of the cargo or dunnage air bag so as to efficiently enable the securing of loaded cargo within cargo holds as well as to efficiently enable the unloading of the secured cargo from the cargo holds.

OBJECTS OF THE INVENTION

Accordingly, it is an object of the present invention to provide a new and improved cargo or dunnage air bag inflation and deflation system for use in conjunction with the securing of cargo loads within transportation facility cargo holds as well as the unloading of the secured cargo loads from the cargo holds of the transportation facility.

Another object of the present invention is to provide a new and improved cargo or dunnage air bag inflation and deflation system, for use in conjunction with the securing of cargo loads within transportation facility cargo holds as well as the unloading of the secured cargo loads from the cargo holds of the transportation facility, wherein the new and improved system overcomes the various operational disadvantages and drawbacks characteristic of PRIOR ART dunnage or air bag inflation systems.

An additional object of the present invention is to provide a new and improved cargo or dunnage air bag inflation and deflation system, for use in conjunction with the securing of cargo loads within transportation facility cargo holds as well as the unloading of the secured cargo loads from the cargo holds of the transportation facility, wherein the system is relative simple in structure.

A further object of the present invention is to provide a new and improved cargo or dunnage air bag inflation and deflation system, for use in conjunction with the securing of cargo loads within transportation facility cargo holds as well as the unloading of the secured cargo loads from the cargo holds of the transportation facility, wherein the system embodies simplified valving structure.

A last object of the present invention is to provide a new and improved cargo or dunnage air bag inflation and deflation system, for use in conjunction with the securing of cargo loads within transportation facility cargo holds as well as the unloading of the secured cargo loads from the cargo holds of the transportation facility, wherein the system embodies simplified valving structure as well as an air gun which is uniquely adapted to be operatively and fluidically mated with such valving structure so as to be capable of achieving both inflation of the cargo or dunnage air bag as well as deflation of the cargo or dunnage air bag.

SUMMARY OF THE INVENTION

The foregoing and other objectives are achieved in accordance with the teachings and principles of the present invention through the provision of a new and improved cargo or dunnage air bag inflation and deflation system which comprises an inflation-deflation valve member, and a cap-type plug member. The valve member comprises a flapper or check valve element pivotally mounted within a lower portion of the valve member so as to permit inflation or deflation of the cargo or dunnage air bag when the flapper or check valve element is moved away from its valve seat, and to substantially maintain the cargo or dunnage air bag in its inflated state when the flappper or check valve element is effectively seated upon its valve seat. The cap-type plug member is removably mounted upon the inflation-deflation valve member so as to effectively close and seal the valve assembly when the cap-type plug assembly is mounted upon the valve member so as to be disposed at its CLOSED state, and which effectively uncovers the valve member when the cap-type plug member is disposed at its OPENED state. More particularly, when the cap-type plug member is disposed at its OPENED state so as to effectively uncover the valve member, a gun-type implement is able to be structurally and fluidically connected to the valve assembly so as to either enable or facilitate the inflation of the cargo or dunnage air bag or to enable or facilitate the deflation of the cargo or dunnage air bag depending upon whether a fill-nozzle end portion of the gun is operatively and fluidically connected to the valve member or whether an exhaust-nozzle end portion of the gun is operatively and fluidically connected to the valve member.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 6:
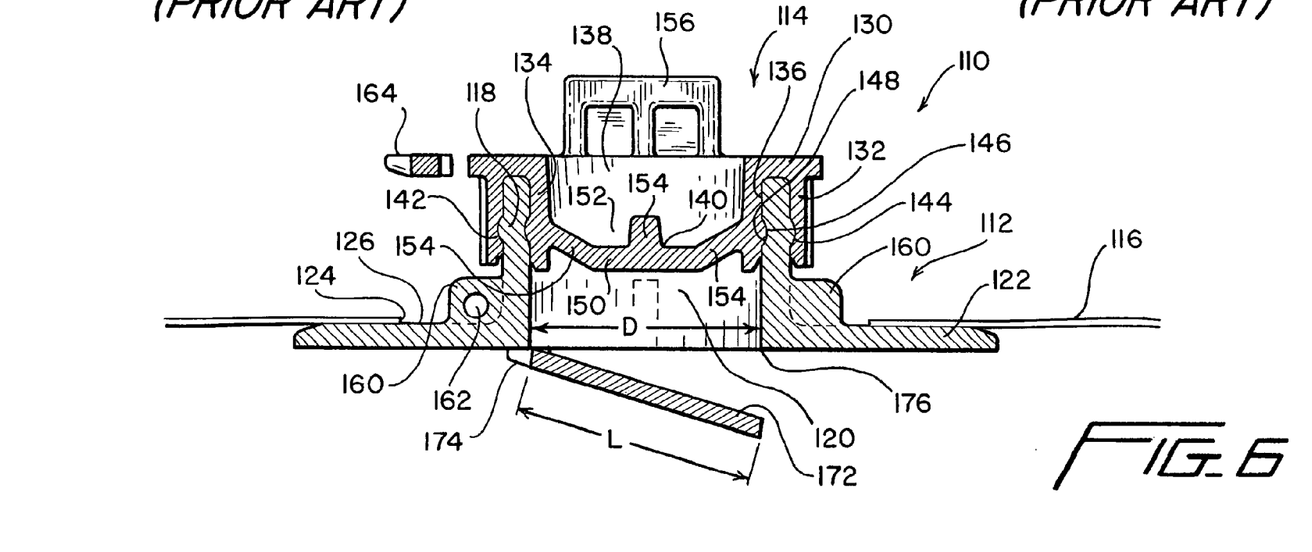
FIG. 6 is a cross-sectional view of the new and improved cargo or dunnage air bag inflation-deflation valve member and cap-type plug assembly shown in FIG. 5 as taken along the lines 6-6 of FIG. 5 and, in addition, shown as mounted upon an interior portion of an inflatable cargo or dunnage air bag.

Referring now to the drawings, and more particularly to FIGS. 4-7 thereof, a first embodiment of a new and improved cargo or dunnage air bag inflation-deflation valve member and cap-type plug assembly, constructed in accordance with the principles and teachings of the present invention and showing the cooperative parts thereof, is disclosed and is generally indicated by the reference character 110. As can be readily appreciated, the cargo or dunnage air bag inflation-deflation valve member and cap-type plug assembly 110 is seen to comprise an inflation-deflation valve member 112, and a cap-type plug or closure member 114, which is adapted to be mounted, in a repetitively removable manner, upon the inflation-deflation valve member 112 when neither an inflation or deflation operative cycle is being performed in connection with an inflatable cargo or dunnage air bag 116, which is shown in FIG. 6, so as to sealingly close the inflatable cargo or dunnage air bag 116 under such non-inflation, non-deflation operative conditions. The inflation-deflation valve member 112 is seen to comprise an axially central, vertically upstanding tubular housing or wall portion 118 defining an axially extending air passageway 120, and a radially outwardly extending flange portion 122 integrally connected to the lowermost end portion of the tubular wall or housing portion 118 as can best be appreciated from FIGS. 6 and 7. More particularly, a wall portion of the air bag 116 is provided with a hole or aperture 124, and the outer or external surface 126 of the radially outwardly extending flange portion 122 of the inflation-deflation valve member 112 is adapted to be heat-sealed or welded to an interior surface portion of the inflatable bladder of the air bag 116 such that the tubular housing or wall portion 118 of the inflation-deflation valve member 112 projects outwardly through the hole or aperture 124 so as to be externally accessible to a source of high-pressure or compressed air which is operatively connected to a gun 128 as is disclosed within FIGS. 8-10 and as will be discussed further hereinafter.

As has been noted hereinbefore, the cap-type plug or closure member 114 is adapted to be mounted, in a repetitively removable manner, upon the inflation-deflation valve member 112 when neither an inflation or deflation operative cycle is being performed in connection with the inflatable cargo or dunnage air bag 116 so as to sealingly close the inflatable cargo or dunnage air bag 116 under such non-inflation, non-deflation operative conditions. More particularly, the cap-type plug or closure member 114 is fabricated from a suitable rubber, thermoplastic, or other relatively compliant material, and it is seen that the cap-type plug or closure member 114 comprises an upper, horizontally disposed, annularly configured planar support member 130, a first radially outer, circumferentially extending peripheral wall 132 projecting axially downwardly from an undersurface portion of the upper planar support member 130 located near the outer peripheral edge portion thereof, and a second radially inner, circumferentially extending wall 134 which also projects axially downwardly from an undersurface portion of the upper planar support member 130 located near the inner peripheral edge portion thereof. The second radially inner, circumferentially extending wall 134 is radially spaced from the first radially outer, circumferentially extending peripheral wall 132 so as to define an annular space 136 therebetween, and in this manner, as can best be appreciated from FIGS. 6 and 7, when the cap-type plug or closure member 114 is mounted upon the inflation-deflation valve member 112, the upwardly extending tubular housing or wall portion 118 of the inflation-deflation valve member 112 will be disposed and accommodated within the annular space 136 defined between the first radially outer and second radially inner circumferentially extending walls 132,134.

The inner peripheral, circumferentially extending surface portion of the second radially inner circumferentially extending wall 134 defines a central recess or pocket 138 which extends axially downwardly from the upper planar support member 130, and a substantially horizontally extending structural member 140, having a substantially circular cross-sectional configuration, is integrally formed upon a lower end portion of the second radially inner, circumferentially extending wall 134. In this manner, the substantially horizontally extending structural member 140 serves as a bottom end wall which closes the recess or pocket 138 and thereby effectively completes the structure of the cap-type plug member 114. In order to assist in securing the cap-type plug or closure member 114 upon the upper end portion of the tubular housing or wall portion 118 of the inflation-deflation valve member 112 in a snap-fitting manner, it is seen further, from FIGS. 4,6, and 7, that the outer wall surface of the tubular housing or wall portion 118 of the inflation-deflation valve member 112 is integrally provided with a circumferentially extending convex band or ridge member 142, while the inner wall surface of the first radially outer, circumferentially extending peripheral wall 132 of the cap-type plug or closure member 114 is correspondingly provided with a circumferentially extending concave recess 144 for accommodating the ridge member 142. In a similar manner, the inner peripheral wall surface of the tubular housing or wall portion 118 of the inflation-deflation valve member 112 is provided with a circumferentially extending concave recessed region 146, and the external peripheral wall surface of the second radially inner, circumferentially extending wall 134 of the cap-type plug or closure member 114 is correspondingly provided with a circumferentially extending convex band or ridge member 148 which is adapted to be accommodated within the recessed region 146 when the cap-type plug or closure member 114 is snap-fitted upon the inflation-deflation valve member 112. It is to be further appreciated that the substantially horizontally extending structural member 140 comprises an axially central, horizontally disposed planar section 150 which is integrally connected to the second radially inner, circumferentially extending wall 134 of the cap-type plug or closure member 114 by means of an upwardly inclined annular wall portion 152.

In addition, a plurality of radially extending rib members 154 structurally reinforce the annular wall portion 152, and it is particularly noted that the lower radially inner ends of the rib members 154 are connected to the planar section 150, while the upper radially outer ends of the rib members 154 are connected to the second radially inner, circumferentially extending wall 134 at elevational levels which substantially correspond to the location of the circumferentially extending convex band or ridge member 148 of the cap-type plug or closure member 114. In this manner, when the cap-type plug or closure member 114 is snap-fittingly mounted upon the inflation-deflation valve member 112, and the interior of the cargo or dunnage air bag 116 is inflated, the air pressure within the inflated cargo or dunnage air bag 116 will act upon the undersurface portion of the axially central, horizontally disposed planar section 150 of the cap-type plug or closure member 114 so as to tend to cause or bias the axially central, horizontally disposed planar section 150 upwardly. Correspondingly, forces will be transmitted by means of the rib members 154 toward the second radially inner, circumferentially extending wall 134 of the cap-type plug or closure member 114 so as to effectively ensure the tight disposition and sealing of the circumferentially extending convex band or ridge member 148 of the cap-type plug or closure member 114 within the circumferentially extending concave recessed region 146 of the inflation-deflation valve member 112.

Figure 7:
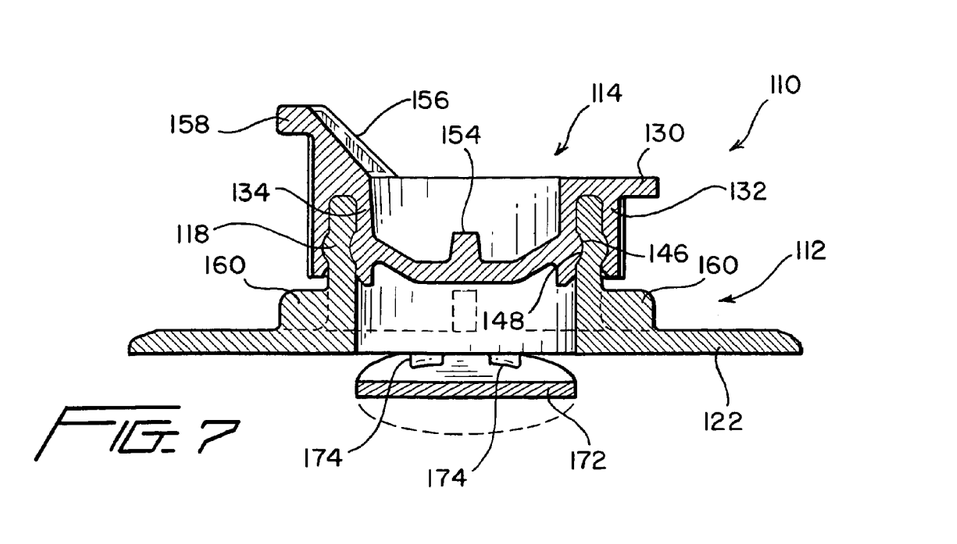
FIG. 7 is a cross-sectional view of the new and improved cargo or dunnage air bag inflation-deflation valve member and cap-type plug assembly shown in FIG. 5 as taken along the lines 7-7 of FIG. 5.

It is further noted that, in connection with the snap-fitted mounting of the cap-type plug or closure member 114 upon the inflation-deflation valve member 112, a substantially upstanding handle or hand-grasping member 156, having a substantially triangularly configured cross-sectional configuration, as best seen from FIG. 7, is integrally formed upon the upper planar support member 130, and that the handle or member 156 further comprises a radially outwardly projecting lip portion 158. It can be appreciated that the member or handle 156, particularly in conjunction with the lip portion 158, facilitates the upward lifting, and the downward depression, of the cap-type plug or closure member 114 with respect to its seated position upon the inflation-deflation valve member 112 during repetitive dismounting or disassembly, and mounting or assembly, respectively, of the cap-type plug or closure member 114 from or upon the inflation-deflation valve member 112. When the cap-type plug or closure member 114 is dismounted or disassembled from the inflation-deflation valve member 112, it is nevertheless desirable to maintain the cap-type plug or closure member 114 attached to the inflation-deflation valve member 112 such that the cap-type plug or closure member 114 does not actually become separated from the inflation-deflation valve member 112 whereby the cap-type plug or closure member 114 could then be misplaced or lost.

Accordingly, it is further seen that the inflation-deflation valve member 112 is provided with a plurality of circumferentially spaced lug members 160 which are integrally formed at the junction of the inner periphery of the flange portion 122 and the lower end portion of the tubular housing or wall portion 118, and that one of the lug members 160 is provided with a through-aperture 162. A tether member 164 is integrally provided upon the upper planar support member 130 and is attached thereto at a proximal end portion 166 which is located substantially diametrically opposite the handle or hand-grasping member 156. The free or distal end portion of the tether member 164 is provided with a substantially triangularly-configured head section 168 which is adapted to be inserted through the aperture 162 defined within the noted lug member 160. Accordingly, when the cap-type plug or closure member 114 is to be initially mounted or assembled upon the inflation-deflation valve member 112, the head section 168 of the tether member 164 is inserted through the aperture 162 of the noted lug member 160 whereby the base portion 170 of the head section 168, after being compressed and forced through the aperture 162, will effectively prevent passage of the triangular head section 168 back through the aperture 162 in a reverse direction or retrograde manner. Therefore, the cap-type plug or closure member 114 is securely attached to the inflation-deflation valve member 112 and can be subsequently sealingly positioned upon the inflation-deflation valve member 112 when desired, that is, for example, either for cargo or dunnage air bag storage purposes, or subsequent to the completion of an air bag inflation procedure, operation, or cycle in order to maintain the cargo or dunnage air bag in its inflated condition or state.

Continuing further, and in accordance with another unique feature of the present invention, a flapper valve or check valve element 172 is operatively associated with the lower end of the air passageway 120 defined within and extending axially through the vertically upstanding tubular housing or wall portion 118 of the inflation-deflation valve member 112. More particularly, the flapper valve or check valve element 172 comprises, in effect, a plate-type member which is integrally formed with the inflation-deflation valve member 112, and as can best be appreciated from FIGS. 6 and 7, a proximal end portion of the flapper valve or check valve element 172 is integrally connected to a lower, inner peripheral region of the vertically upstanding tubular housing or wall portion 118 by means of a pair of arcuately spaced living hinge mechanisms 174,174. As noted within FIG. 6, the air passageway 120, defined within and extending axially through the vertically upstanding tubular housing or wall portion 118 of the inflation-deflation valve member 112, has a predetermined diametrical extent D, and the flapper valve or check valve component 172 likewise has a predetermined diametrical or cross-sectional extent L wherein the diametrical or cross-sectional extent L of the flapper valve or check valve element 172 is slightly greater than the diametrical extent D of the air passageway 120.

The reason for this is that when the interior of the dunnage or cargo air bag 116 is pressurized and inflated, it is desirable that the air pressure within the dunnage or cargo air bag 116 will tend to close the flapper valve or check valve element 172 with respect to the lower end portion of the air passageway 120 such that the flapper valve or check valve element 172 is positioned upon its valve seat 176 which is defined by means of the annular wall portion of the inflation-deflation valve member 112 which is formed at the juncture of the vertically upstanding tubular housing or wall portion 118 and the radially outwardly extending flange portion 122. In this manner, the seating of the flapper valve or check valve element 172 upon its valve seat 176 effectively prevents any massive leakage of the pressurized air out from the interior portion of the dunnage or cargo air bag prior to the operator having the opportunity to sealingly close the air passageway 120 of the inflation-deflation valve member 112 by sealingly mounting the cap-type plug or closure member 114 thereon. However, it is likewise desirable that the flapper valve or check valve element 172 does not become trapped or otherwise stuck within the lower end portion of the air passageway 120 so as to always be capable of freely performing its valving functions in connection with the inflation of the dunnage or cargo air bag 116, the deflation of the dunnage or cargo air bag 116, and the maintenance of the inflated state or condition of the dunnage or cargo air bag 116. Accordingly, it can be appreciated that when the flapper valve or check valve element 172 is moved toward its CLOSED position, the outer periphery of the flapper valve or check valve element 172 will abut or be disposed in contact with the valve seat portion 176 of the inflation-deflation valve member 112, however, the flapper valve or check valve element 172 will not actually enter or be disposed internally within the lower end portion of the air passageway 120.

Figure 8:
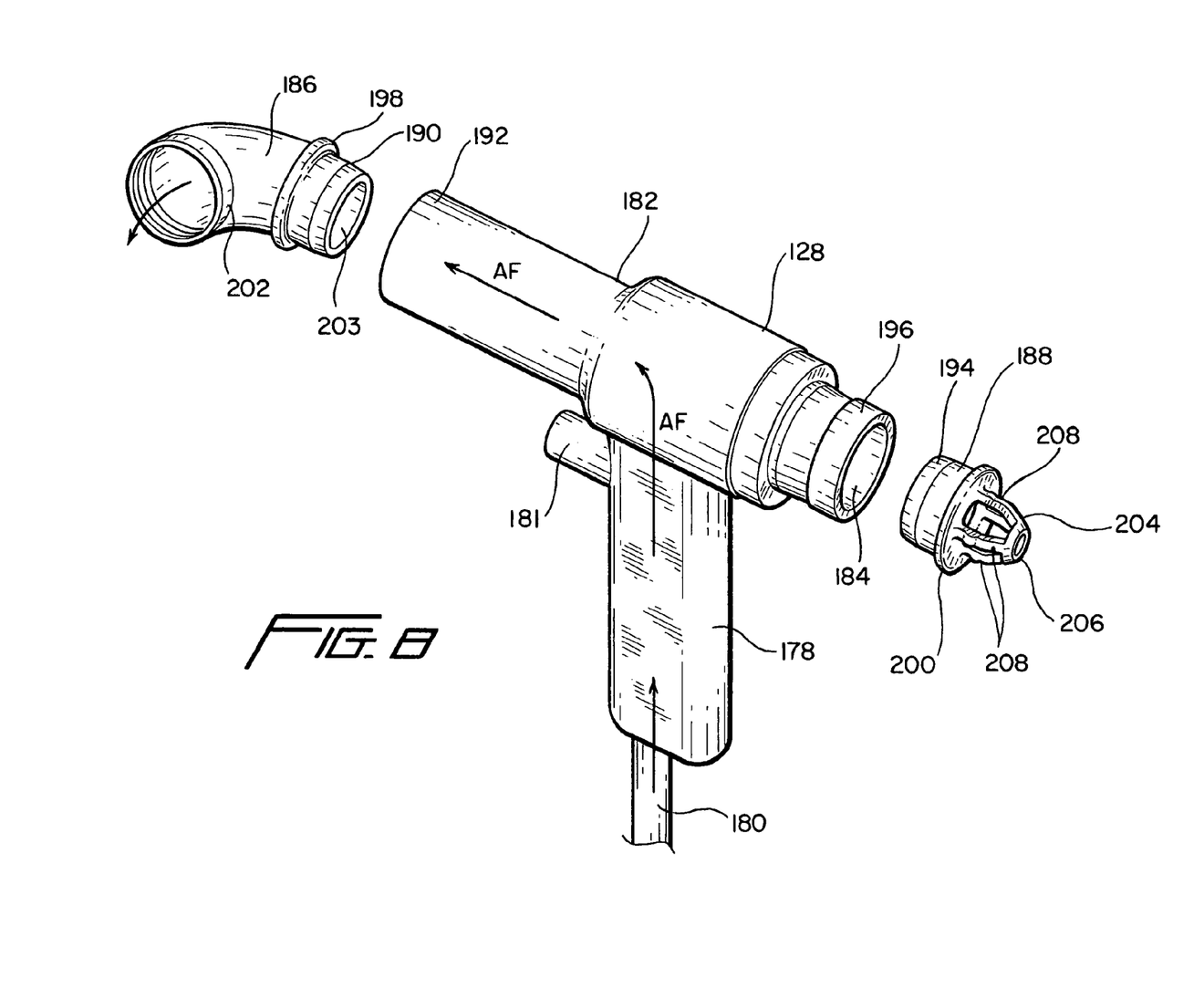
FIG. 8 is an exploded perspective view of a new and improved inflation-deflation gun for operative use in conjunction with the new and improved cargo or dunnage air bag inflation-deflation valve member shown in FIGS. 4-7.
Figure 9:
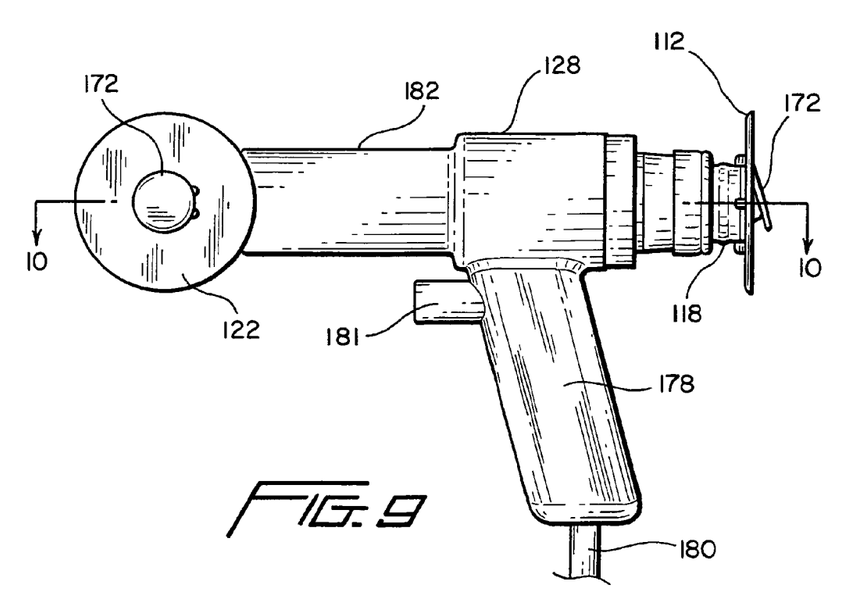
FIG. 9 is a side elevational view of the new and improved inflation-deflation gun schematically illustrating the operative use of each operative end of the gun in conjunction with a new and improved cargo or dunnage air bag inflation-deflation valve member shown in FIGS. 4-7.
Figure 10:
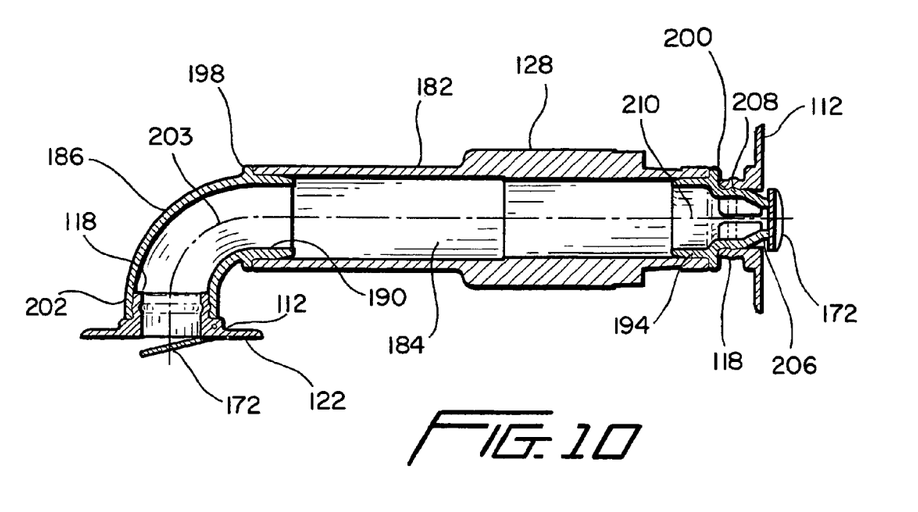
FIG. 10 is a cross-sectional view, of the new and improved inflation-deflation gun schematically illustrating the operative use of each operative end of the gun in con-junction with a new and improved cargo or dunnage air bag inflation-deflation valve member shown in FIGS. 4-7, as taken along the lines 10-10 of FIG. 9.

With reference now being made to FIGS. 8-10, the new and improved air gun implement 128, as constructed in accordance with the principles and teachings of the present invention, and which is adapted to be used in conjunction with the inflation-deflation valve member 112 for achieving inflation and deflation of the dunnage or cargo air bag 116, will now be discussed and described. More particularly, the air gun implement 128 may comprise, for example, a VORTEC Model 2100/BPS type gun which is available from ITW VORTEC in Cincinnati, OHIO, and is seen to include an upstanding handle 178 to which an air hose 180 is operatively connected. A trigger member 181 is reciprocably mounted upon the upper end portion of the handle 178 so as to control a suitable valve mechanism, not shown, between a CLOSED state at which the incoming pressurized air from hose 180 is effectively prevented from flowing through the air gun implement 128, and an OPENED state at which the incoming pressurized air from hose 180 is permitted to flow through the air gun implement 128. A barrel section 182 of the air gun implement 128 is integrally mounted atop the handle 178, and an air flow-through passageway 184, having a predetermined internal diametrical extent, is defined within the barrel section 182 so as to permit air flow therethrough as shown by means of the fluid flow arrows AF illustrated in FIG. 8.

As viewed in FIGS. 8-10, the left open end portion of the barrel section 182 of the air gun implement 128 is adapted to have a tubular fill nozzle member 186 fixedly mounted therein, while the right open end portion of the barrel section 182 of the air gun implement 128 is similarly adapted to have a tubular exhaust nozzle member 188 fixedly mounted therein. The upstream end portion 190 of the fill nozzle member 186, as considered in the direction of air flow as denoted by means of the fluid flow arrows AF, has a predetermined external diametrical extent which is slightly smaller than the predetermined internal diametrical extent of the barrel flow-through passageway 184 so as to permit the same to be disposed internally within the downstream end portion 192 of the barrel section 182, while the downstream end portion 194 of the exhaust nozzle member 188 similarly has a predetermined external diametrical extent which is likewise slightly smaller than the predetermined internal diametrical extent of the barrel flow-through passageway 184 so as to permit the same to be disposed internally within the upstream end portion 196 of the barrel section 182. The upstream end portion 190 of the fill nozzle member 186 is provided with an annular flange 198 which is adapted to abut, engage, and be seated upon the open end wall of the downstream end portion 192 of the barrel section 182 when the fill nozzle member 186 is mounted within the downstream end portion 192 of the barrel section 182, as can best be appreciated from FIGS. 8 and 10, and the downstream end portion 194 of the exhaust nozzle member 188 is similarly provided with an annular flange 200 which is likewise adapted to abut, engage, and be seated upon the open end wall of the upstream end portion 196 of the barrel section 182 when the exhaust nozzle member 188 is mounted within the upstream end portion 196 of the barrel section 182.

In a similar manner, the downstream end portion 202 of the fill nozzle member 186 has a predetermined internal diametrical extent which is slightly larger than the external diametrical extent of the vertically upstanding tubular housing or wall portion 118 of the inflation-deflation valve member 112 so as to permit the air gun implement 128, and in particular, the fill nozzle member 186 thereof, to be fluidically connected to the inflation-deflation valve member 112 as illustrated within the left side portion of FIG. 10. As a result of such fluidic connection defined between the fill nozzle member 186 of the air gun implement 128 and the inflation-deflation valve member 112, and upon actuation of the trigger member 181 of the air gun implement 128, high-pressure air from air hose 180 will flow through the passageway 184 of the air gun implement 128 and the passageway 203 of the fill nozzle member 186 thereby impinging upon the flapper valve or check valve element 172 so as to thereby unseat the same from its valve seat 176 and permit inflation of the dunnage or cargo air bag 116. Alternatively, it is likewise noted that the upstream end portion 204 of the exhaust nozzle member 188 has a predetermined external diametrical extent which is slightly less than the internal diametrical extent of the vertically upstanding tubular housing or wall portion 118 of the inflation-deflation valve member 112 so as to permit the air gun implement 128, and in particular, the exhaust nozzle member 188 thereof, to be fluidically connected to the inflation-deflation valve member 112 as illustrated within the right side portion of FIG. 10.

More particularly, the upstream end portion 204 of the exhaust nozzle member 188 comprises a nosepiece 206 which is integrally connected to the annular flange member 200 by means of a plurality of circumferentially spaced spider-legs 208. Consequently, when it is desired to deflate the dunnage or cargo air bag 116, the exhaust nozzle member 188 is mated with, inserted into, and internally disposed within the inflation-deflation valve member 112. As can best be appreciated from FIGS. 9 and 10, the nosepiece 206 will therefore engage the flapper valve or check valve member 172 thereby unseating the valve element 172, and maintaining the same away, from its valve seat 176 so as to establish fluidic communication between the interior of the dunnage or cargo air bag 116 and the passageway 210 of the exhaust nozzle member 188 as well as with the flow-through passageway 184 of the air gun implement 128. Accordingly, upon actuation of the trigger member 181 of the air gun implement 128, high-pressure air from air hose 180 will flow through passageway 184 of air gun implement 128, as well as through passageway 203 of fill nozzle member 186, so as to exhaust to atmosphere, while at the same time, or concomitantly therewith, air will be sucked out of or exhausted from the interior of the dunnage or cargo air bag 116 so as to likewise be exhausted past flapper valve or check valve element 172, between spider-legs 208, through exhaust nozzle passageway 210, gun barrel passageway 184, and fill nozzle passageway 203.

Figure 11:
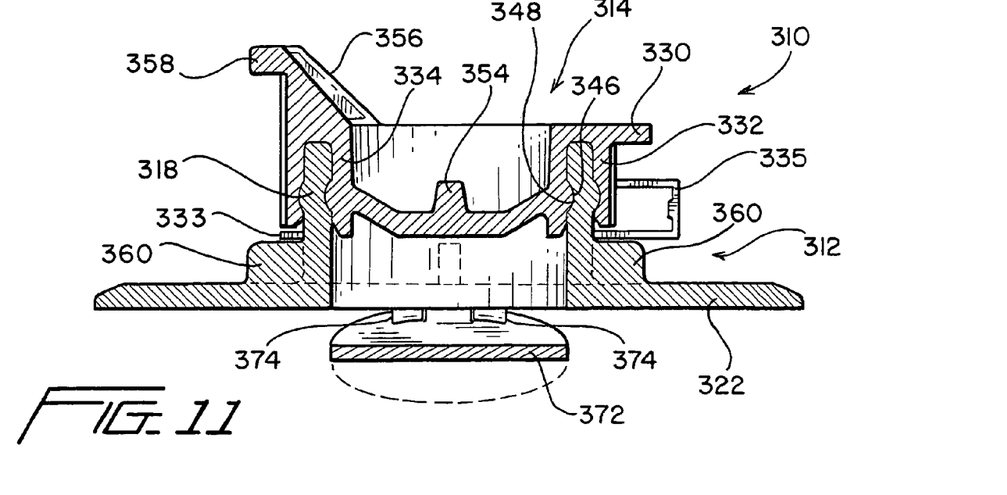
FIG. 11 is a cross-sectional view similar to that of FIG. 7 showing, however, a second embodiment of a new and improved cargo or dunnage air bag inflation-deflation valve member and cap-type plug assembly constructed in accordance with the principles and teachings of the present invention and showing the cooperative parts thereof.

With reference lastly being made to FIG. 11, a second embodiment of a new and improved cargo or dunnage air bag inflation-deflation valve member and cap-type plug assembly, constructed in accordance with the principles and teachings of the present invention and showing the cooperative parts thereof, is disclosed and is generally indicated by the reference character 310. It is to be noted that the structural components comprising the second embodiment of the dunnage or cargo air bag inflation-deflation valve member and cap-type plug assembly 310 are substantially the same as those of the first embodiment of the dunnage or cargo air bag inflation-deflation valve member and cap-type plug assembly 110, except as will be noted hereinafter, and therefore, a detailed description of such second embodiment of the dunnage or cargo air bag inflation-deflation valve member and cap-type plug assembly 310 will be omitted for brevity purposes. Accordingly, it is further noted in conjunction with the description of the second embodiment of the dunnage or cargo air bag inflation-deflation valve member and cap-type plug assembly 310 that the various structural components thereof, which are similar to the various structural components of the first embodiment of the dunnage or cargo air bag inflation-deflation valve member and cap-type plug assembly 110 are denoted by means of corresponding reference characters except that they are within the 300 series. More particularly, as can be seen from FIG. 11, the only significant difference between the second embodiment of the dunnage or cargo air bag inflation-deflation valve member and cap-type plug assembly 310 and that of the first embodiment of the dunnage or cargo air bag inflation-deflation valve member and cap-type plug assembly 110 resides in the fact that in lieu of the cap-type plug or closure member 114 being connected to the inflation-deflation valve member 112 by means of tether 164, an annular ring member 333 is adapted to be mounted upon the external peripheral surface of the vertically upstanding tubular housing or wall portion 318 of the inflation-deflation valve member 312, and an external peripheral portion of the radially outer, circumferentially extending peripheral wall 332 of the cap-type plug or closure member 314 is integrally connected to the annular ring member 333 by means of a living hinge element 335. In this manner, as was the case of the first embodiment of the dunnage or cargo air bag inflation-deflation valve member and cap-type plug assembly 110, the cap-type plug or closure member 314 is securely fixed to the inflation-deflation valve member 312 so as not to be separated therefrom and thereby misplaced or lost.

Thus, it may be seen that in accordance with the principles and teachings of the present invention, there has been developed a new and improved inflation-deflation valve member and cap-type plug assembly wherein the same comprises a relatively simple flapper valve or check valve element incorporated within the inflation-deflation valve member. In addition, a new and improved air gun implement has a fill nozzle member and an exhaust valve member operatively mounted upon opposite ends thereof so as to be able to fluidicalally and structurally interact with the flapper valve or check valve element and thereby achieve inflation and deflation of the dunnage or cargo air bag.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. An inflation-deflation valve member and closure member assembly for use in connection with the inflation and deflation of an inflatable container, comprising:

a valve member comprising a tubular housing portion, disposed around an axis and defining an air passageway having a predetermined diametrical extent and through an open end of which air can be supplied into an inflatable container and exhausted from the inflatable container so as to respectively inflate and deflate the inflatable container, and a radially outwardly extending flange portion integrally mounted upon a lower end portion of said tubular housing portion for sealed fixation to an interior surface portion of the inflatable container such that when said radially outwardly extending flange portion is fixed to the interior surface portion of the inflatable container, said tubular housing portion of said valve member projects outwardly from the inflatable container so as to be accessible to a source of pressurized air whereby said air passageway of said tubular housing portion will be fluidically connected to the interior of the inflatable container;

a valve element movably mounted upon said radially outwardly extending flange portion of said valve member and having a predetermined diametrical extent which is slightly greater than said predetermined diametrical extent of said air passageway such that when said valve element is disposed at a first CLOSED position at which said valve element substantially closes said air passageway defined within said tubular housing portion of said valve member so as to effectively prevent inflation and deflation of the inflatable container, said valve element will abut a portion of said radially outwardly extending flange portion of said valve member which defines a peripheral portion of said air passageway defined within said tubular housing portion of said valve member so as not to be capable of being disposed internally within said air passageway defined within said tubular housing portion of said valve member, and a second OPENED position at which said valve element substantially uncovers said air passageway defined within said tubular housing portion of said valve member so as to effectively permit inflation and deflation of the inflatable container;

a closure member removably mountable upon said tubular housing portion of said valve member so as to permit the passage of air through said tubular housing portion of said valve member in connection with an inflation operation and a deflation operation for the inflatable container when said closure member is dismounted from said tubular housing portion of said valve member, and to prevent the passage of air through said tubular housing portion of said valve member so as to in turn prevent the inflation and deflation of the inflatable container when said closure member is mounted upon said tubular housing portion of said valve member, said closure member comprising radially spaced radially inner and radially outer wall members for respectively engaging radially inner and radially outer wall surface portions of said tubular housing portion of said valve member when said closure member is mounted upon said tubular housing portion of said valve member; and means for connecting said radially outer wall member of said closure member to said tubular housing portion of said valve member at an axial position remote from said open end of said tubular housing portion of said valve member so as to permit said closure member to be mounted upon said tubular housing portion of said valve member, and removed from said tubular housing portion of said valve member, while maintaining the connection of said closure member to said tubular housing portion of said valve member.

2. The assembly as set forth in claim 1, wherein:
said valve element comprises a flapper-type valve element.

3. The assembly as set forth in claim 2, wherein:
said valve element is integrally connected to said valve member by means of living hinge structure.

4. The assembly as set forth in claim 1, wherein:
said valve element comprises a check valve element.

5. The assembly as set forth in claim 4, wherein:
said valve element is integrally connected to said valve member by means of living hinge structure.

6. The assembly as set forth in claim 1, further comprising:
tether means for operatively connecting said closure member to said valve member so as to prevent separated loss of said closure member from said valve member when said closure member has been dismounted from said valve member.

7. The assembly as set forth in claim 1, further comprising:
living hinge means for operatively connecting said closure member to said valve member so as to prevent separated loss of said closure member from said valve member when said closure member has been dismounted from said valve member.

8. The assembly as set forth in claim 1, further comprising:
finger-grip means mounted upon said closure member for facilitating the dismounting and mounting of said closure member from and upon said valve member.

9. The assembly as set forth in claim 1, wherein:
said radially inner wall surface portion of said tubular housing portion of said valve member has an annularly extending concave recess defined therein;
said radially outer wall surface portion of said tubular housing portion of said valve member has an annularly extending convex ridge member defined thereon;
said radially inner wall member of said closure member has an annularly extending convex ridge member defined thereon for snap-fitted disposition within said annularly extending concave recess defined within said radially inner wall surface portion of said tubular housing portion of said valve member when said closure member is mounted upon said tubular housing portion of said valve member; and
said radially outer wall member of said closure member has an annularly extending concave recess defined therein for snap-fitted accommodation of said annularly extending convex ridge member defined within said radially outer wall surface portion of said tubular housing portion of said valve member when said closure member is mounted upon said tubular housing portion of said valve member.

10. The assembly as set forth in claim 9, wherein said closure member further comprises:
a substantially planar section disposed within said tubular housing portion of said valve member when said closure member is mounted upon tubular housing portion of said valve member; and
a plurality of radially extending rib members interconnecting said substantially planar section of said closure member to said annularly extending convex ridge member of said radially inner wall member of said closure member such that when air pressure forces, from within the inflatable container, act upon said substantially planar section of said closure member, said plurality of radially extending rib members will force said annularly extending convex ridge member of said radially inner wall member of said closure member into said annularly extending concave recess defined within said radially inner wall member of said tubular housing portion of said valve member so as to maintain said closure member seated upon said tubular housing portion of said valve member.

11. In combination, an inflation-deflation valve member, and an air gun implement, for use in connection with the inflation and deflation of an inflatable container, comprising:
a valve member having a first portion comprising a flanged member for sealed fixation to an interior surface portion of an inflatable container and defining a valve seat portion disposed internally within the inflatable container, a second tubular housing portion disposed around an axis for projection outwardly from the inflatable container so as to define a first air passageway therewithin, which is accessible to a source of pressurized air, through which air can be supplied into the inflatable container and exhausted from the inflatable container so as to respectively inflate and deflate the inflatable container, and a valve element movably mounted upon said first portion of said valve member, disposed internally within the inflatable container, so as to also be disposed internally within the inflatable container, said valve element being movable between a CLOSED position when said valve element is engaged with and seated upon said valve seat portion disposed internally within the inflatable container, and an OPENED position when said valve element is disengaged and unseated from said valve seat portion disposed internally within the inflatable container;

a closure member removably mountable upon said tubular housing portion of said valve member so as to permit the passage of air through said tubular housing portion of said valve member in connection with an inflation operation and a deflation operation for the inflatable container when said closure member is dismounted from said tubular housing portion of said valve member, and to prevent the passage of air through said tubular housing portion of said valve member so as to in turn prevent the inflation and deflation of the inflatable container when said closure member is mounted upon said tubular housing portion of said valve member, said closure member comprising radially spaced radially inner and radially outer wall members for respectively engaging radially inner and radially outer wall surface portions of said second tubular housing portion of said valve member when said closure member is mounted upon said tubular housing portion of said valve member;

an air gun having a second air passageway defined therein;

means for fluidically connecting said air gun to a source of pressurized air whereby pressurized air can be supplied to said second air passageway defined within said air gun;

a first end of said second air passageway defined within said air gun having first means for connection to said valve member for supplying pressurized air from said second air passageway of said air gun and toward said valve element such that the pressurized air impacts upon said valve element, disposed internally within the inflatable container, so as to move said valve element away from said valve seat portion of said valve member, and said seated and CLOSED position defined internally within the inflatable container, to said unseated and OPENED position defined internally within the inflatable container, and flows into the inflatable container so as to inflate the inflatable container; and a second end of said second air passageway defined within said air gun having second means for connection to said valve member, for insertion within said second tubular portion of said valve member, and for directly engaging said valve element, which is disposed internally within the inflatable container and which is movably mounted upon said valve seat portion of said valve member disposed internally of the inflatable container, so as to move said valve element away from said valve seat portion of said valve member, and said seated and CLOSED position, to said unseated and OPENED position and thereby permit air from the inflatable container to be exhausted from the inflatable container, through said second tubular portion of said valve member projecting outwardly from the inflatable container, and into said second air passageway of said air gun so as to deflate the inflatable container.

12. The combination as set forth in claim 11, wherein:
said valve element is movably mounted upon said valve member between said first CLOSED position at which said valve element substantially closes said first air passageway defined within said tubular housing portion of said valve member so as to effectively prevent inflation and deflation of the inflatable container, and said second OPENED position at which said valve element substantially uncovers said first air passageway defined within said tubular housing portion of said valve assembly so as to effectively permit inflation and deflation of the inflatable container.

13. The combination as set forth in claim 12, wherein:
said valve element comprises a flapper-type valve element.
14. The combination as set forth in claim 13, wherein:
said valve element is integrally connected to said valve member by means of living hinge structure.
15. The combination as set forth in claim 12, wherein:
said valve element comprises a check valve element.

16. The combination as set forth in claim 15, wherein:
said valve element is integrally connected to said valve member by means of living hinge structure.
17. The combination as set forth in claim 12, wherein:
said first air passageway defined within said tubular housing portion of said valve member has a predetermined diametrical extent; and
said valve element has a predetermined diametrical extent which is slightly larger than said predetermined diametrical extent of said first air passageway such that when said valve element is disposed at its CLOSED position, said valve element cannot enter said first air passageway.

18. The combination as set forth in claim 11, wherein said air gun further comprises:
a handle;
means for attaching an air hose, fluidically connected to the source of pressurized air, to said handle for supplying pressurized air from the source of pressurized air to said air gun;
a barrel portion integrally attached to an upper portion of said handle and having first and second end portions;
said second air passageway is defined within said barrel portion and extends between said first and second end portions thereof;
said first means disposed within said first end of said second air passageway comprises a fill nozzle fixedly mounted upon said first end portion of said barrel portion for fluidic connection to said second air passageway in order to fluidically supply pressurized air from said air hose into the inflatable container when said fill nozzle is connected to said valve member so as to inflate the inflatable container; and
said second means disposed within said second end of said second air passageway comprises an exhaust nozzle fixedly mounted upon said second end portion of said barrel portion for fluidic connection to said second air passageway in order to fluidically connect the inflatable container to said second air passageway when said exhaust nozzle is connected to said valve member so as to deflate the inflatable container.

19. The combination as set forth in claim 11, further comprising:
tether means for operatively connecting said closure member to said valve member so as to prevent separated loss of said closure member from said valve member when said closure member has been dismounted from said valve member.

20. The combination as set forth in claim 11, further comprising:
living hinge means for operatively connecting said closure member to said valve member so as to prevent separated loss of said closure member from said valve member when said closure member has been dismounted from said valve member.

21. The combination as set forth in claim 11, further comprising:
finger-grip means mounted upon said closure member for facilitating the dismounting and mounting of said closure member from and upon said valve member.

22. The combination as set forth in claim 18, wherein:
said exhaust nozzle comprises a nosepiece for engaging said valve element when said exhaust nozzle is fluidically connected to said valve member so as to move said valve element to said OPENED position and thereby permit air from the inflatable container to be exhausted from the inflatable container.

23. The combination as set forth in claim 11, wherein:
said radially inner wall surface portion of said tubular housing portion of said valve member has an annularly extending concave recess defined therein;
said radially outer wall surface portion of said tubular housing portion of said valve member has an annularly extending convex ridge member defined thereon;
said radially inner wall member of said closure member has an annularly extending convex ridge member defined thereon for snap-fitted disposition within said annularly extending concave recess defined within said radially inner wall surface portion of said tubular housing portion of said valve member when said closure member is mounted upon said tubular housing portion of said valve member; and
said radially outer wall member of said closure member has an annularly extending concave recess defined therein for snap-fitted accommodation of said annularly extending convex ridge member defined within said radially outer wall surface portion of said tubular housing portion of said valve member when said closure member is mounted upon said tubular housing portion of said valve member.

24. The combination as set forth in claim 23, wherein said closure member further comprises:
a substantially planar section disposed within said tubular housing portion of said valve member when said closure member is mounted upon tubular housing portion of said valve member; and
a plurality of radially extending rib members interconnecting said substantially planar section of said closure member to said annularly extending convex ridge member of said radially inner wall member of said closure member such that when air pressure forces, from within the inflatable container, act upon said substantially planar section of said closure member, said plurality of radially extending rib members will force said annularly extending convex ridge member of said radially inner wall member of said closure member into said annularly extending concave recess defined within said radially inner wall member of said tubular housing portion of said valve member so as to maintain said closure member seated upon said tubular housing portion of said valve member.

* * * * *

UNITED STATES PATENT AND TRADEMARK OFFICE
CERTIFICATE OF CORRECTION

PATENT NO.         : 7,610,929 B2
APPLICATION NO.    : 10/147894
DATED              : November 3, 2009
INVENTOR(S)        : Zielinski et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 621 days.

Signed and Sealed this

Twelfth Day of October, 2010

David J. Kappos
*Director of the United States Patent and Trademark Office*